(12) United States Patent
Genaro

(10) Patent No.: US 8,868,244 B2
(45) Date of Patent: Oct. 21, 2014

(54) SUPPORT SURFACE WITH PROXIMITY SENSOR AND OPERABLE IN LOW POWER MODE

(75) Inventor: David M. Genaro, Coral Springs, FL (US)

(73) Assignee: Anodyne Medical Device, Inc., Coral Springs, FL (US)

( * ) Notice: Subject to any disclaimer, the term of this patent is extended or adjusted under 35 U.S.C. 154(b) by 333 days.

(21) Appl. No.: 13/110,310

(22) Filed: May 18, 2011

(65) Prior Publication Data

US 2011/0218684 A1 Sep. 8, 2011

Related U.S. Application Data

(63) Continuation-in-part of application No. 12/700,451, filed on Feb. 4, 2010, now abandoned.

(51) Int. Cl.
*G05D 7/06* (2006.01)
*A47C 27/10* (2006.01)

(52) U.S. Cl.
CPC . *A47C 27/10* (2013.01); *G05D 7/06* (2013.01)
USPC ............................................ 700/282; 5/655.3

(58) Field of Classification Search
CPC ........ G05D 7/06; A47C 27/10; A47C 27/081; A47C 27/082; A47C 27/083; A47C 27/084
USPC .................... 700/275, 282; 5/655.3, 710, 713
See application file for complete search history.

(56) References Cited

U.S. PATENT DOCUMENTS

| | | | |
|---|---|---|---|
| 4,833,457 A | 5/1989 | Graebe, Jr. | |
| 4,989,283 A | 2/1991 | Krouskop | |
| 5,176,424 A * | 1/1993 | Tobita et al. | 297/284.1 |
| 5,410,297 A | 4/1995 | Joseph et al. | |
| 5,509,155 A | 4/1996 | Zigarac et al. | |
| 5,560,374 A | 10/1996 | Viard | |
| 5,687,438 A | 11/1997 | Biggie et al. | |
| 5,808,552 A * | 9/1998 | Wiley et al. | 340/573.4 |
| 5,848,450 A * | 12/1998 | Oexman et al. | 5/713 |
| 5,979,585 A | 11/1999 | Van Voorhies | |
| 6,058,537 A | 5/2000 | Larson | |
| 6,088,642 A * | 7/2000 | Finkelstein et al. | 701/49 |
| 6,088,643 A * | 7/2000 | Long et al. | 701/49 |
| 6,094,762 A * | 8/2000 | Viard et al. | 5/713 |
| 6,098,000 A * | 8/2000 | Long et al. | 701/49 |
| 6,203,105 B1 * | 3/2001 | Rhodes, Jr. | 297/284.6 |
| 6,375,432 B1 * | 4/2002 | Krasny et al. | 417/46 |
| 6,385,803 B1 | 5/2002 | Viard | |
| 6,560,804 B2 | 5/2003 | Wise et al. | |
| 6,583,727 B2 * | 6/2003 | Nunome | 340/665 |
| 6,742,202 B2 | 6/2004 | Jones | |
| 6,763,541 B2 * | 7/2004 | Mahoney et al. | 5/713 |
| 6,922,863 B2 | 8/2005 | Giori et al. | |
| 6,943,694 B1 | 9/2005 | Ellis | |
| 7,107,642 B2 * | 9/2006 | Wong et al. | 5/713 |

(Continued)

*Primary Examiner* — Charles Kasenge
(74) *Attorney, Agent, or Firm* — Nixon & Vanderhye P.C.

(57) ABSTRACT

A support surface includes a pump and a plurality of air cells that are selectively inflated and deflated by the pump. A proximity sensor detects whether an object is supported on the air cells, and a control unit connected to the pump and the proximity sensor controls operation of the pump based on a signal from the proximity sensor. Battery power can be saved by operating the device in a power save mode when the proximity sensor determines that the user has left the support surface.

9 Claims, 1 Drawing Sheet

(56) References Cited

U.S. PATENT DOCUMENTS

| | | | |
|---|---|---|---|
| 7,217,891 B2 * | 5/2007 | Fischer et al. | 177/144 |
| 7,409,735 B2 | 8/2008 | Kramer et al. | |
| 7,685,658 B2 * | 3/2010 | Lokhorst et al. | 5/424 |
| 8,049,520 B2 | 11/2011 | Schleeh | |
| 8,102,270 B2 | 1/2012 | Gowda et al. | |
| 8,104,126 B2 * | 1/2012 | Caminade et al. | 5/715 |
| 8,181,292 B1 * | 5/2012 | Pellettiere | 5/654 |
| 8,598,893 B2 * | 12/2013 | Camus | 324/661 |
| 2002/0196148 A1 * | 12/2002 | Nunome | 340/573.1 |
| 2004/0177449 A1 * | 9/2004 | Wong et al. | 5/713 |
| 2005/0268401 A1 * | 12/2005 | Dixon et al. | 5/655.3 |
| 2006/0175097 A1 * | 8/2006 | Pirzada | 177/145 |
| 2008/0005843 A1 * | 1/2008 | Lokhorst et al. | 5/655.3 |
| 2009/0100604 A1 * | 4/2009 | Caminade et al. | 5/713 |
| 2009/0106905 A1 * | 4/2009 | Ochi et al. | 5/713 |
| 2010/0064443 A1 * | 3/2010 | Lee | 5/713 |
| 2010/0308846 A1 * | 12/2010 | Camus | 324/679 |
| 2011/0014501 A1 * | 1/2011 | Scheucher | 429/7 |
| 2011/0289691 A1 * | 12/2011 | Lafleche et al. | 5/710 |
| 2011/0296623 A1 * | 12/2011 | Lafleche et al. | 5/713 |
| 2011/0296624 A1 * | 12/2011 | Lafleche et al. | 5/713 |
| 2011/0301516 A1 * | 12/2011 | Lafleche et al. | 601/49 |
| 2011/0302720 A1 | 12/2011 | Yakam et al. | |

* cited by examiner

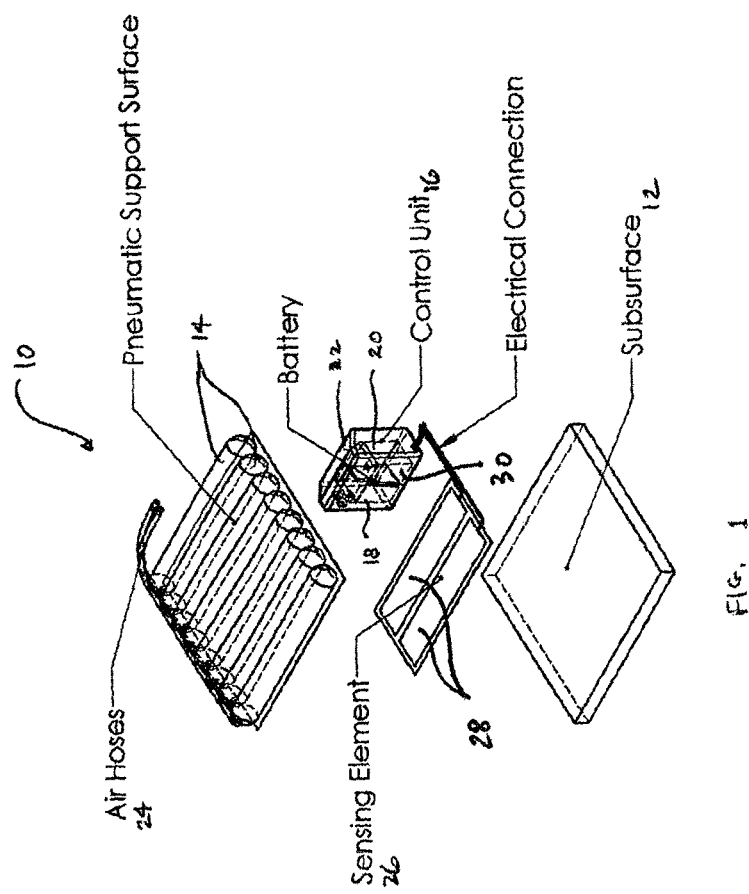

SUPPORT SURFACE WITH PROXIMITY SENSOR AND OPERABLE IN LOW POWER MODE

CROSS-REFERENCES TO RELATED APPLICATIONS

This application is a continuation-in-part of U.S. patent application Ser. No. 12/700,451, filed Feb. 4, 2010 now abandoned, pending, the entire contents of which is hereby incorporated by reference in this application.

STATEMENT REGARDING FEDERALLY SPONSORED RESEARCH OR DEVELOPMENT (NOT APPLICABLE)

BACKGROUND OF THE INVENTION

Support surfaces are used for patients that are susceptible to wounds caused by continuous pressure on any part of the body. When a patient utilizes a support surface made of materials such as air, foam, or gel, there is a likelihood of "bottoming out." On an air or pneumatic support surface, bottoming out occurs when the air cells in a given zone, or individual cells, contain insufficient pressure to support the weight that is on them. This results in the patient coming in direct contact with the subsurface beneath the air cells. The subsurface could be a foam substrate or even the bed frame itself. Such direct contact compromises the provided pressure relief and allows high and continuous pressure points on the patient's skin, which can lead to skin breakdown.

On a foam support surface, the patient bottoms out when either (1) the patient is too heavy for the particular design of that foam mattress, i.e., the density and ILD (Indentation Load Deflection—which is a measure of the load-bearing capacity of foam) of the foam itself is not sufficient to fully support the patient without bottoming out, or (2) due to the age of the surface, the foam has lost its ability to provide proper support.

When caring for bedridden patients on a pneumatic support surface, one of the caregiver's important duties is to ensure that the patient is not "bottoming out." To ensure this, the mattress pressures must be set to accommodate the patient in a variety of positions. This often results in cell pressures that are set higher than what is required to support the patient and to provide optimal therapy.

Surfaces used on wheelchairs, medical chairs and full mattresses often use battery power to operate the inflatable air cells. Batteries are used instead of common 120 volt line current to provide mobility, in the case of a wheelchair and patient transfers, and for remote locations, where no wall socket is conveniently available.

Battery power for the support surface needs to be of sufficient capacity to allow significant run-time between recharging cycles. This can be accomplished by using very large batteries, such as car batteries. But, of course, that has the drawback of requiring excessive size and weight. Battery chemistry (e.g., sealed lead acid, nickel metal hydride, lithium ion) can affect the battery life as well as the charging routine. However, the run-time between recharging cycles is most affected by the current draw used while the system is operating.

In practice, such systems are often left on after the patient has left the surface, which causes needless battery drain and shortens the run-time. This also results in additional recharging cycles, which shortens the battery life. This is a particular problem in the case of semi-ambulatory patients who enter and leave the surface unattended, but still need a support surface to prevent breakdown.

BRIEF SUMMARY OF THE INVENTION

It would be desirable to prevent the unintentional draw on the battery when a patient leaves the powered support surface. It would also be desirable for the surface to automatically power back up when the patient returns. With the use of proximity sensors according to preferred embodiments, the system will conserve battery power, prevent unintentional battery discharge, and prolong the usable life of the battery. Additionally, it would be desirable for the system to enable self-calibration to optimize the pressure for the current occupant.

In an exemplary embodiment, a support surface includes a pump and a plurality of air cells that are selectively inflated and deflated by the pump. A proximity sensor detects whether an object is supported on the air cells, and a control unit connected to the pump and the proximity sensor controls operation of the pump based on a signal from the proximity sensor. In one arrangement, the proximity sensor includes a pair of lateral conductors and a converter, wherein the converter converts a capacitance between the lateral conductors into an electronic signal representative of a change in dielectric coefficient between the lateral conductors. Preferably, the pair of lateral conductors are disposed at a fixed distance from each other.

The control unit may be programmed to operate the pump and the proximity sensor in a full power mode and a power save mode. The control unit operates in the full power mode when the proximity sensor detects an object supported on the air cells, and the control unit operates in the power save mode when the proximity sensor detects no object supported on the air cells. In the power save mode, the control unit operates only the proximity sensor.

The control unit may also be programmed to operate in a calibration mode when the proximity sensor detects an object supported on the air cells. In the calibration mode, the control unit measures a high capacitance state and a low capacitance state, where the high capacitance state corresponds to a minimum inflation value for the air cells relative to the object supported on the air cells, and the low capacitance state corresponds to a maximum inflation value for the air cells relative to the object supported on the air cells.

The proximity sensor preferably includes a pair of fixed lateral conductors, where a capacitance measured by the proximity sensor is function of a distance that an object on the support surface is from the lateral conductors.

The support surface may additionally include a power source connectable with the pump, the proximity sensor, and the control unit, where the power source is a battery.

In another exemplary embodiment, a support surface includes a pump, a plurality of valves cooperable with the pump, and a plurality of air cells that are selectively inflated and deflated by the pump via the plurality of valves. A proximity sensor detects whether an object is supported on the air cells, and a control unit is connected to the pump, the valves, and the proximity sensor. The control unit also includes a display. The display has a visual output of operating parameters of the support surface. The control unit is programmed for operation in a full power mode and a power save mode based on a signal from the proximity sensor, where in the power save mode, power is provided only to the proximity sensor.

In yet another exemplary embodiment, a method of operating a support surface includes the steps of (a) detecting with the proximity sensor whether an object is supported on the air cells; (b) the proximity sensor outputting a signal to the control unit; and (c) the control unit controlling operation of the pump based on the signal from the proximity sensor. If the proximity sensor detects that an object is not supported on the air cells in step (a), the control unit operates in a power save mode in which power is supplied only to the proximity sensor. In this context, if the proximity sensor detects that an object is supported on the air cells in step (a), the control unit operates in a full power mode. The method may also include operating the control unit in a calibration mode by measuring a high capacitance state and a low capacitance state, the high capacitance state corresponding to a minimum inflation value for the air cells relative to the object supported on the air cells, and the low capacitance state corresponding to a maximum inflation value for the air cells relative to the object supported on the air cells.

BRIEF DESCRIPTION OF THE DRAWINGS

These and other aspects and advantages will be described in detail with reference to the accompanying drawings, in which:

FIG. 1 is a schematic exploded view of an exemplary support surface.

DETAILED DESCRIPTION OF THE INVENTION

FIG. 1 shows an exemplary support surface 10 including a subsurface 12, and a plurality of air cells 14 for supporting a patient. A control unit 16 includes electronics such as a microprocessor and the like to control operation of the support surface. The control unit 16 houses a pump 18 and a power source 20 such as a battery and includes a display 22. The pump 18 is coupled with the air cells 14 via a plurality of air hoses and valves 24. The air cells are selectively inflated and deflated by the pump 18 via the plurality of valves 24 under control of the control unit 16.

A proximity sensor 26 is also connected with the control unit 16. The proximity sensor generally detects whether an object such as a patient is supported on the air cells 14. There are many types of proximity sensors that are suitable and many support surface configurations, and the invention is not meant to be limited to the exemplary configurations shown and described.

An exemplary proximity sensor 26 includes a pair of electrical conductors 28 that run laterally across the bed, from side to side. These conductors form a capacitor which changes value based on patient proximity. Interface/sensing electronics 30 translate changes in capacitance into electronic signals which can be analyzed by the controller. As shown in FIG. 1, the proximity sensor 26 is preferably placed beneath the air cells 14 and is connected electrically to the control unit 16, which contains the air pump 18, the battery 20, a microcontroller board, valves, caregiver controls, the display screen 22, etc.

When a patient is supported on the surface, the proximity sensor 26 detects the increase in capacitance caused by the increase in the dielectric coefficient between the two plates due to the presence of a human body "bridging" the sensing conductors. The change, in this case, is in the "medium" between the two plates, and not the distance between them. Detecting this change in capacitance, the proximity sensor 26 sends a signal to the control unit 16, which then automatically powers up the pump 18, using the battery 20 in a full power mode.

When the patient leaves the support surface, the proximity sensor 26 detects a lower capacitance, and sends a corresponding signal to the control unit 16. The system then reverts to a low power "sensing-only" mode or a power save mode, thereby reducing the draw on the battery 20. In this mode, the unit is in a standby mode, consuming only enough power to receive signals from the proximity sensor 26, awaiting full power-up.

The system utilizes the proximity sensor 26 in a self-calibration mode. When first powered up, the control unit 16 fully deflates all the air cells 14, thus letting the patient come in virtual contact with the sensor 26. This would be a "high capacitance" state. The control unit 16 then inflates the cells to a high pressure, which would correspond to a "low capacitance" state. The distance the patient is from the sensor is interpolated from these two points.

The self-calibration mode always assures that an optimum pressure is set for the patient to prevent "bottoming out" (i.e., the patient coming in contact with the seat base, instead of being supported by the air pressure). The self-calibration mode requires no set up time from the caregiver to preset the estimated correct high pressure. This feature also saves battery power by preventing the pressure from being set higher than necessary to prevent bottoming out, thus running the pump for a shorter amount of time each cycle.

The system of the described embodiments advantageously uses a proximity sensor to sense the presence of an occupant on a support surface. The system automatically powers up and includes the self-calibration mode to adjust to the appropriate pressure without intervention by a caregiver. When the patient leaves the chair, the system reverts to a low power mode, thereby saving battery life.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A support surface comprising:
    a pump;
    a plurality of air cells, the air cells being selectively inflated and deflated by the pump;
    a proximity sensor that detects whether an object is supported on the air cells; and
    a control unit connected to the pump and the proximity sensor, the control unit controlling operation of the pump based on a signal from the proximity sensor, wherein the control unit is programmed to operate the pump and the proximity sensor in a full power mode and a power save mode, the control unit operating in the full power mode when the proximity sensor detects an object supported on the air cells, wherein the control unit is programmed to operate in the power save mode when the proximity sensor detects no object supported on the air cells, and wherein in the power save mode, the control unit operates only the proximity sensor.

2. A support surface according to claim 1, further comprising a power source connectable with the pump, the proximity sensor, and the control unit, wherein the power source comprises a battery.

3. A support surface comprising:
    a pump;

a plurality of air cells, the air cells being selectively inflated and deflated by the pump;

a proximity sensor that detects whether an object is supported on the air cells; and a control unit connected to the pump and the proximity sensor, the control unit controlling operation of the pump based on a signal from the proximity sensor, wherein the control unit is programmed to operate in a calibration mode when the proximity sensor detects an object supported on the air cells, the control unit in the calibration mode being programmed to measure a high capacitance state and a low capacitance state, the high capacitance state corresponding to a minimum inflation value for the air cells relative to the object supported on the air cells, and the low capacitance state corresponding to a maximum inflation value for the air cells relative to the object supported on the air cells.

4. A support surface comprising:

a pump;

a plurality of valves cooperable with the pump;

a plurality of air cells, the air cells being selectively inflated and deflated by the pump via the plurality of valves;

a proximity sensor that detects whether an object is supported on the air cells; and a control unit connected to the pump, the valves, and the proximity sensor, and comprising a display, the display including a visual output of operating parameters of the support surface, wherein the control unit is programmed for operation in a full power mode and a power save mode based on a signal from the proximity sensor, and wherein in the power save mode, power is provided only to the proximity sensor.

5. A support surface according to claim 4, wherein the control unit is programmed for operation in a calibration mode in which the proximity sensor outputs a first signal representative of a distance between an object supported on the support surface with the air cells in a max inflated state and a second signal representative of a distance between the object supported on the support surface with the air cells in a fully deflated state, the control unit in the calibration mode determining a minimum inflation value for the object.

6. A support surface according to claim 4, further comprising a power source connectable with the pump, the valves, the proximity sensor, and the control unit, wherein the power source comprises a battery.

7. A method of operating a support surface, the support surface including a pump, a plurality of air cells coupled with the pump, a proximity sensor having a pair of lateral conductors disposed at a fixed distance from each other, and a control unit connected to the pump and the proximity sensor, the method comprising:

(a) detecting with the proximity sensor whether an object is supported on the air cells by using the object as a dielectric medium for the lateral conductors to form a variable capacitor;

(b) the proximity sensor outputting a signal to the control unit;

(c) the control unit controlling operation of the pump based on the signal from the proximity sensor; and (d) operating the control unit in a calibration mode by measuring a high capacitance state and a low capacitance state, the high capacitance state corresponding to a minimum inflation value for the air cells relative to the object supported on the air cells, and the low capacitance state corresponding to a maximum inflation value for the air cells relative to the object supported on the air cells.

8. A method of operating a support surface, the support surface including a pump, a plurality of air cells coupled with the pump, a proximity sensor, and a control unit connected to the pump and the proximity sensor, the method comprising:

(a) detecting with the proximity sensor whether an object is supported on the air cells;

(b) the proximity sensor outputting a signal to the control unit; and (c) the control unit controlling operation of the pump based on the signal from the proximity sensor, wherein if the proximity sensor detects that an object is not supported on the air cells in step (a), the control unit operating in a power save mode in which power is supplied only to the proximity sensor.

9. A method according to claim 8, wherein if the proximity sensor detects that an object is supported on the air cells in step (a), the control unit operating in a full power mode.

\* \* \* \* \*